Oct. 31, 1933.  W. O. THEWES  1,932,563

CUTTER DIE

Filed March 9, 1931

Inventor

WILLIAM O. THEWES.

By Richey & Watts
Attorney

Patented Oct. 31, 1933

1,932,563

UNITED STATES PATENT OFFICE 1,932,563

CUTTER DIE

William O. Thewes, North Ridgeville, Ohio, assignor to The Ridge Tool Company, North Ridgeville, Ohio, a corporation of Ohio Application March 9, 1931. Serial No. 521,187

3 Claims. (Cl. 164—70)

This invention relates to cutter wheels or dies and a method of making same, and has for its principal object to provide a cutter wheel especially adapted for pipe cutters which is simple yet unusually durable in construction and which may be expeditiously manufactured at a comparatively low cost.

An example of a pipe cutter for which the present type of cutter wheel are adapted is disclosed in my copending application Serial No. 131,399, filed August 25, 1926.

The various features of novelty and superiority of the improved cutter wheel will become apparent in view of the following description taken in conjunction with the drawing, wherein.

Figure 1:
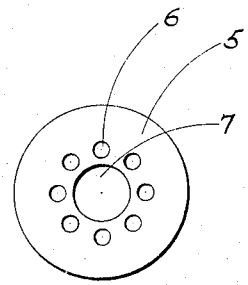
Figs. 1 and 2 are views in side and edge elevation of the cutter blade.
Figure 2:
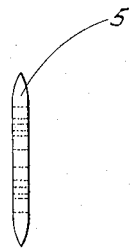
Figure 3:
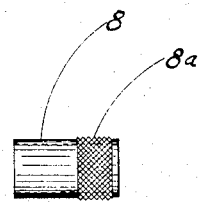
Fig. 3 is a detail view in side elevation of a ferrule on which the blade may be mounted and cast thereto.

The cutter blade generally indicated at 5 may be made of suitable metal such as tool steel and is provided with a series of perforations or key holes 6 and a central opening 7.

The numeral 8 designates a ferrule on which the blade 5 is mounted and cast as an integral unit therewith. The ferrule 8 is provided with a knurled key portion 8a and the blade is inserted on the ferrule against the said portion as shown in Fig. 4.

Figure 4:
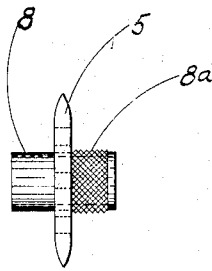
Fig. 4 shows the blade and ferrule assembled ready for the casting operation.
Figure 5:
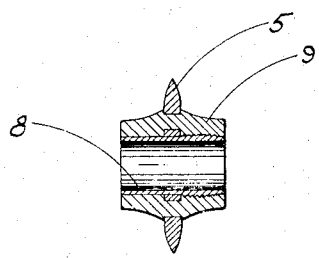
Fig. 5 is a transverse vertical sectional view of the completed cutter wheel.

The assembly as shown in Fig. 4 is then ready for the die casting operation. The ferrule may be made of suitable hard metal and in casting the blade to the ferrule, the assembled unit shown in Fig. 4 may be placed in a suitable mold and the casting metal applied under pressure in a well known manner around the ferrule and through the key holes 6, forming a hub portion 9, which is keyed to both the blade and ferrule, as shown in Fig. 5. The key holes 6 are of a predetermined size, calculated in accordance with practical experience in die-casting, and may be for example, in the relative proportions shown in Fig. 1. The casting metal, upon chilling, contracts on both sides of the blade and between the key holes 6 and holds the blade firmly to the ferrule.

The resultant article is a die cast cutting wheel which is unusually durable and simple in construction and of relatively low cost in manufacture. Machining costs are eliminated, as the ferrules and blades may be made in stock sizes and the hub portion cast to the desired dimensions, yet at the same time the cutter blade is rigidly braced and the unit as a whole embodies the necessary weight and strength and presents a pleasing contour.

I claim:

1. A cutter wheel comprising a ferrule of hard metal, a blade mounted on the ferrule, said blade being provided with a series of key holes arranged in annular formation around the ferrule, and a hub of cast metal interlocked with said blade and ferrule.

2. A cutter wheel comprising a ferrule of hard metal, a blade mounted on the ferrule, said ferrule being provided with a keying surface portion, and a hub portion of cast metal keyed to said ferrule and said blade.

3. As an article of manufacture, a die cast cutter wheel comprising a ferrule of hard metal, an annular cutter blade mounted on said ferrule, and a hub portion of cast metal keyed to said blade and ferrule.

WILLIAM O. THEWES.